(12) United States Patent
Wei

(10) Patent No.: US 10,050,347 B2
(45) Date of Patent: Aug. 14, 2018

(54) FLEXIBLE RFID ANTENNA

(71) Applicant: Johnson Electric S.A., Murten (CH)

(72) Inventor: Yu Hua Wei, Shanghai (CN)

(73) Assignee: JOHNSON ELECTRIC S.A., Murten (CH)

( * ) Notice: Subject to any disclaimer, the term of this patent is extended or adjusted under 35 U.S.C. 154(b) by 201 days.

(21) Appl. No.: 14/983,232

(22) Filed: Dec. 29, 2015

(65) Prior Publication Data

US 2016/0190694 A1     Jun. 30, 2016

(30) Foreign Application Priority Data

Dec. 30, 2014   (CN) .......................... 2014 1 0855007

(51) Int. Cl.
*H01Q 7/00* (2006.01)
*H01Q 1/38* (2006.01)
*H01Q 1/22* (2006.01)
*G06K 7/10* (2006.01)

(52) U.S. Cl.
CPC ........... *H01Q 7/00* (2013.01); *G06K 7/10336* (2013.01); *H01Q 1/2225* (2013.01); *H01Q 1/38* (2013.01)

(58) Field of Classification Search
CPC ........... H01Q 1/38; H01Q 7/00; H01Q 1/2225
See application file for complete search history.

(56) References Cited

U.S. PATENT DOCUMENTS

| | | | | |
|---|---|---|---|---|
| 7,126,482 B2 * | 10/2006 | Shoji | ..................... | G06K 19/041 340/572.7 |
| 8,669,909 B2 * | 3/2014 | Yamaguchi | .............. | H01Q 7/06 343/787 |
| 9,379,442 B2 * | 6/2016 | Thomas | ........... | G06K 19/07766 |
| 9,935,481 B2 * | 4/2018 | Yamaguchi | ............. | H02J 7/025 |
| 2003/0033713 A1 * | 2/2003 | Hausladen | ....... | G06K 19/07749 29/873 |
| 2008/0055047 A1 * | 3/2008 | Osada | .................. | H01Q 1/2225 340/10.1 |
| 2012/0081257 A1 * | 4/2012 | Yosui | ................... | H01Q 1/2225 343/788 |

* cited by examiner

*Primary Examiner* — Nader Bolourchi
(74) *Attorney, Agent, or Firm* — Muncy, Geissler, Olds & Lowe, P.C.

(57) ABSTRACT

An RFID antenna has a flexible single-sided substrate including a first end, a second end and a leading-out terminal. A plurality of parallel conductors are provided on the substrate and extend between the first end and the second end of the substrate. One of the multiple conductors is broken at the leading-out terminal and extends to an end of the leading-out terminal to form a connection terminal. A flexible covering layer is attached to the substrate and covers the conductors. Ends of the conductors on the first end of the substrate are respectively connected to ends of the conductors on the second end of the substrate to form a helical RFID coil.

18 Claims, 4 Drawing Sheets

Figure 5a
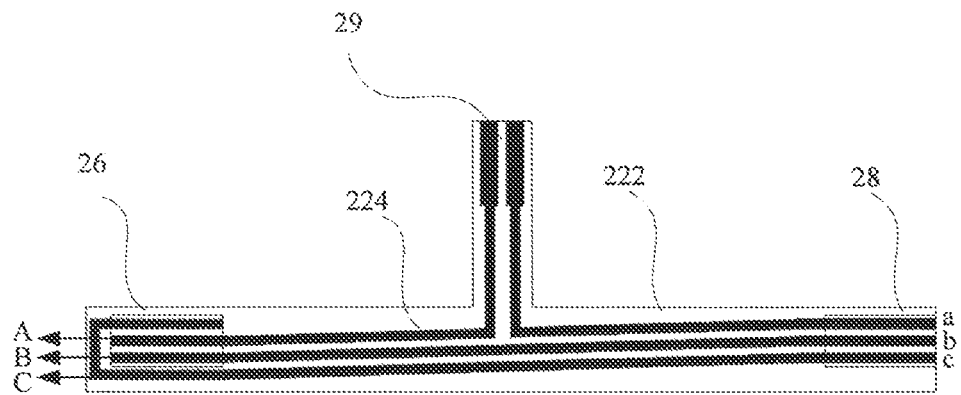
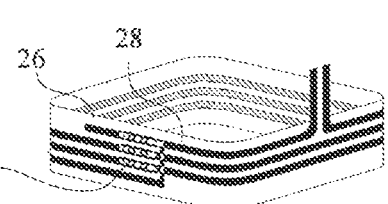
Figure 5b
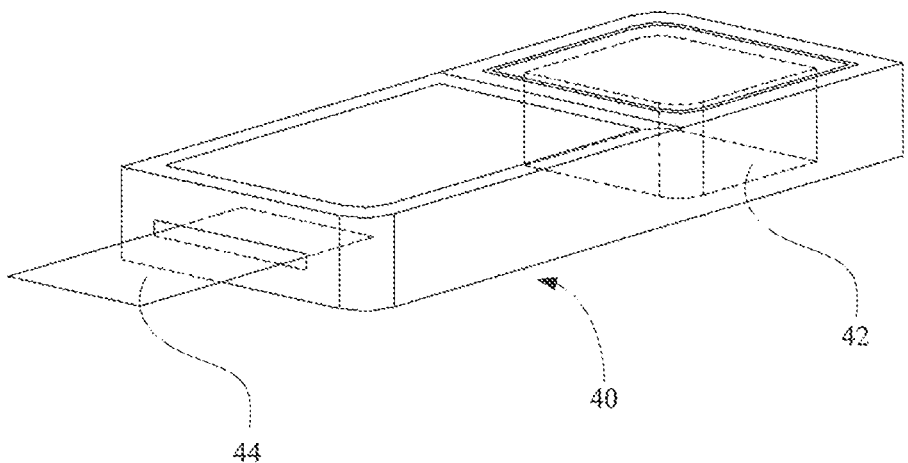
Figure 5c

FLEXIBLE RFID ANTENNA

CROSS REFERENCE TO RELATED APPLICATIONS

This non-provisional patent application claims priority under 35 U.S.C. § 119(a) from Patent Application No. 201410855007.1 filed in The People's Republic of China on Dec. 30, 2014, the entire contents of which are hereby incorporated by reference.

FIELD OF THE INVENTION

This invention relates to a radio frequency identification (RFID) device and in particular, to a flexible RFID antenna for such a device.

BACKGROUND OF THE INVENTION

With the development of communication industries, RFID technology has been widely applied in more and more fields. Radio frequency identification technology is a wireless communication technology with which a specific object may be identified and related data may be read and written based on a radio signal, without establishing a mechanical contact or an optical contact between an identification system and the specific object.

The RFID technology is applied in many industries. For example, a tag is attached onto a car being produced, and the factory party may track the progress of the car on the production line. The position of a drug may be tracked in a warehouse. A radio frequency tag may be attached to livestock and pets, allowing the livestock and pets to be positively identified ("positively identified" means to avoid that several animals use the same identify). An identification card based on RFID technology may allow an employee to enter a locked building, and a radio frequency transponder in a car may be used for paying fees related to toll road and parking, for example.

For portable electronic devices, such as a point-of-sales (POS) device, sometimes it is necessary to cover a safety protection device with resin or package the safety protection device, which results in the structure of the safety protection device being heavier and thicker. Therefore, an RFID antenna is widely used in the field of POS devices, to increase an internal space to accommodate more components, thereby making the POS device smaller and lighter.

FIG. 1 shows a manufacturing process of an RFID antenna using conventional technology. The base material 1 is a flexible base material of 250 mm×320 mm, from which eight RFID antenna substrates 2 are cut. A helical coil of a conductor forming a layer on the antenna substrate 2 is formed by means of printing or etching to form a helical antenna. The conductors may be copper traces or other conductive traces. Ends of the conductor occur at an inner periphery and at an outer periphery. Since the end at the inner periphery of the antenna needs to be led to the outer periphery so that the two ends are connected together to other ports, through holes are arranged on the substrate to connect conductively the inner periphery to the outer periphery. Hence, the flexible base material must be a double-sided base material, that is, conductive lines may be arranged on both sides of the base material, which increases the cost and complicates the production process. In addition, this manner of making the antenna is not an efficient use of the material due to the high percentage of discarded material. This further increases the cost of the POS device.

SUMMARY OF THE INVENTION

Hence, there is a desire for an antenna having a higher utilization of materials.

Accordingly, in one aspect thereof, the present invention provides a flexible RFID antenna, comprising: a flexible single-sided substrate comprising a first end, a second end and a lead-out terminal; a plurality of conductors arranged on the substrate extending between the first end and the second end of the substrate and one conductor of the plurality of conductors being broken at the lead-out terminal and extends to an end of the lead-out terminal to form a connection terminal; and a flexible covering layer applied to the substrate to sandwich the plurality of conductors between the substrate and the covering layer, wherein ends of the plurality of conductors on the first end of the substrate are respectively connected in a staggered arrangement to ends of the plurality of conductors on the second of the substrate to form a helical RFID coil.

Preferably, both the substrate and the coating layer are slender in shape.

Preferably, the substrate comprises a first insulating layer of polyester (PET) film or a polyimide (PI) film with a thickness from 12 µm to 125 µm.

Preferably, the substrate further comprises a first adhesive layer for attaching the plurality of conductors to the substrate.

Preferably, the covering layer comprises a second insulating layer of a polyester (PET) film, a polyimide (PI) film or an insulating ink layer with a thickness from 12 µm to 50 µm.

Preferably, the covering layer further comprises a second adhesive layer for attaching the second insulating layer to the substrate.

Preferably, the covering layer comprises an insulating ink layer.

Preferably, the substrate of the antenna is provided with a fixing portion to fix the antenna.

Preferably, the first end and the second end of the antenna overlap with each other, and the ends of the plurality of conductors on the first end are electrically connected to respective the ends of the plurality of conductors on the second end by rivets.

According to a second aspect, the present invention provides an electronic device, comprising: a main body, a circuit board and an RFID antenna arranged on the main body, wherein the RFID antenna comprises: a flexible single-sided substrate comprising a first end, a second end and a lead-out terminal; a plurality of parallel conductors arranged on the substrate extending between the first end and the second end of the substrate and one conductor of the plurality of conductors being broken at the lead-out terminal and extends to an end of the lead-out terminal to form a connection terminal; and a flexible covering layer applied to the substrate to sandwich the plurality of conductors between the substrate and the covering layer, wherein ends of the plurality of conductors on the first end of the substrate are respectively connected in a staggered arrangement to ends of the plurality of conductors on the second of the substrate to form a helical RFID coil, and wherein the helical antenna is arranged around the main body and the connection terminal of the lead-out terminal of the antenna is electrically connected to the POS device.

Optionally, the substrate of the antenna is provided with a fixing portion, and the antenna is fixed on the main body of the POS device via the fixing portion.

Preferably, the antenna is fixed on the main body of the POS device via an adhesive.

Preferably, the electronic device is a POS device.

Using such an antenna, material utilization is high and, as a circuit is needed to be printed on only one side of the antenna substrate, the production process is simplified and the cost is significantly reduced.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIGS. 5a, 5b and 5c are schematic diagrams of connection of an RFID antenna according to one embodiment of the present invention, wherein the covering layer of the antenna body has been omitted.

DETAILED DESCRIPTION OF THE PREFERRED EMBODIMENTS

Figure 1:
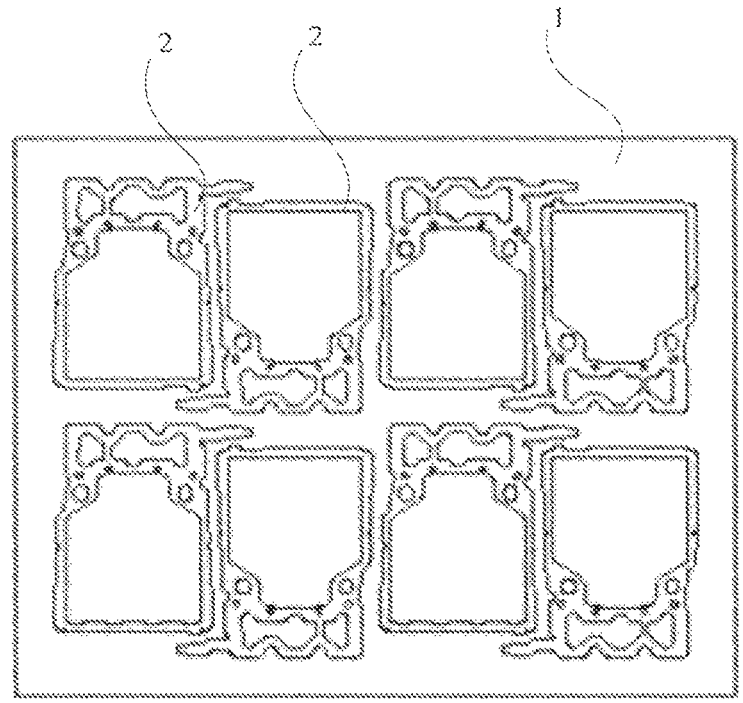
FIG. 1 illustrates a prior art RFID antenna base material.
Figure 2:
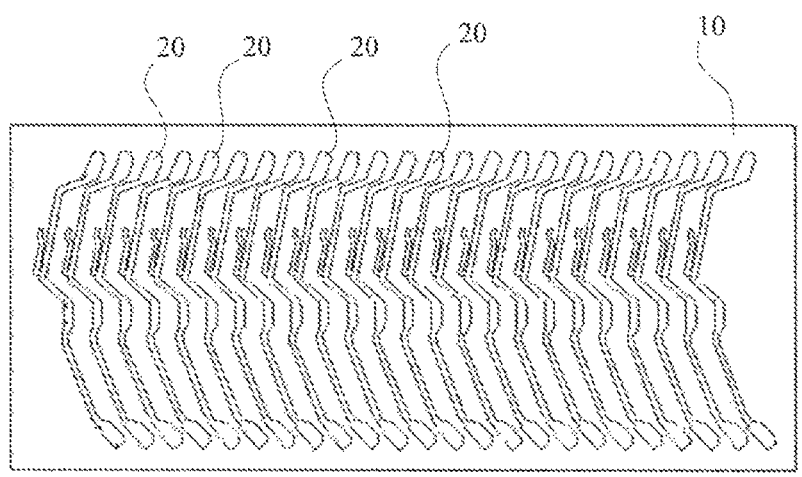
FIG. 2 illustrates an RFID antenna base material according to one embodiment of the present invention.

FIG. 2 illustrates an exemplary structure of an RFID antenna base material according to the preferred embodiment of the present invention. In this embodiment, the entire base material 10 is a rectangular, single-sided, flexible base material, that is, a circuit may be printed or etched on only one side of the base material 10. The antennas 20 are designed to be of a slender shape, such as an essentially elongated rectangular shape, and are arranged in sequence on the surface of the base material 10 on which a circuit may be printed or etched. Individual antennas 20 are cut from the base material 10. Multiple parallel conductors 224 are arranged on each of the antennas 20 by means of printing or etching (see FIG. 5). Through such process, 24 antennas may be formed on a base material 10 of 609 mm×320 mm. Thus, the production efficiency is greatly improved by better material utilization.

Conductor traces 224 are typically made of a copper material, but may be made of aluminum, silver, carbon, a mixture of silver and carbon, a transparent conductive polymer, or other conductive ink. Each of the above materials has specific characteristics suitable for the operation and function of the RFID antenna. The material of the conductor traces 224 is selected depending on the function of the RFID antenna.

Figure 3:
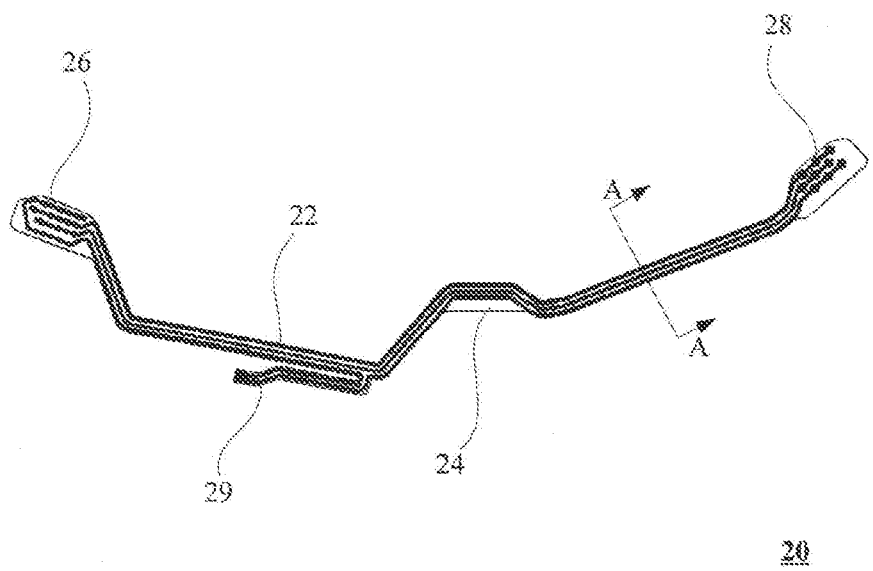
FIG. 3 is a plan view of one of the antennas shown in FIG. 2.

FIG. 3 illustrates an exemplary single antenna cut from the base material of FIG. 2. The antenna 20 includes a slender body 22 provided with two ends 26 and 28 and a lead-out terminal 29. One of the conductors 224 is broken and extends to the lead-out terminal to form the lead-out connections to connect the antenna to an electronic devices such as a POS device, as shown in FIG. 5. A covering layer 228 is provided on the substrate and covering the conductors, (see FIG. 4). The covering layer 228 is removed from the ends 26 and 28 to expose the conductors to allow connection to a connector 30 (see FIG. 6). The antenna body 22 is provided with a fixing part 24 at a location away from the two ends. The fixing part 24 is provided with a fixing hole for fixing the antenna to the electronic apparatus. It can be appreciated by those skilled in the art, that the antenna body may be attached to the electronic apparatus by adhesive, thus not requiring any fixing parts.

Figure 4:
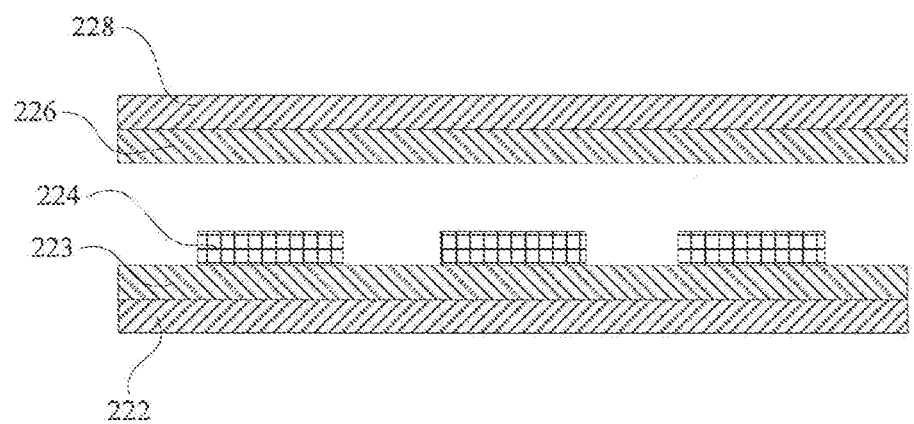
FIG. 4 is a schematic cross-sectional view along A-A of the antenna of FIG. 3.

FIG. 4 is a schematic, cross-sectional view along A-A of the antenna of FIG. 3. In one embodiment, the antenna includes a single-sided insulating substrate 222, an adhesive layer 223, a plurality of parallel conductors 224 formed by conductive traces, an adhesive layer 226 and an insulating covering layer 228. Both the adhesive layer 223 and the adhesive layer 226 are made of insulating materials. In the production process, the conductors 224 are firstly arranged on the substrate 222 including the adhesive layer 223 by means of printing or etching, then the covering layer 228 including the adhesive layer 226 is attached onto the substrate, and thus the parallel conductors 224 are sandwiched between the substrate 222 and the covering layer 228. The multiple parallel conductors 224 are electrically insulated from each other.

In an alternative embodiment, the adhesive layer 223 may be omitted with the conductors 224 being fixed directly on the substrate 222, such as by printing traces using a conductive ink.

In an alternative embodiment, the covering layer 228 and the adhesive layer 226 may be replaced by a single layer of insulation ink, thereby further reducing the thickness of the antenna.

In one embodiment, the substrate 222 is a polymer film, preferably a polyethylene terephthalate (PET, commonly known as Dacron) film. Alternatively, the substrate 222 is a flexible film with a thickness between 12 μm and 125 μm. As a matter of course, the substrate 222 may be thicker as needs dictate. It can be appreciated that the substrate 222 may be other variations of polymer film, including but not limited to polycarbonate, polyethylene napthalate (PEN), polyimide, and polyvinyl chloride (PVC). The substrate 222 may be transparent or opaque and colored, for example, black or white.

The adhesive layers 223 and 226 are preferably heat-sensitive adhesive layers. The adhesive layer 223 is configured to attach the conductors 224 to the substrate 222. Alternatively, the adhesive may also be a liquid adhesive such as epoxy resin, or moisture cured polyurethane. The liquid adhesive is firstly placed or printed between the single-sided substrate 222 and the conductors 224, then the liquid adhesive is cured by wet energy, thermal energy, or ultraviolet light energy, and thus a permanent bond is formed between the single-sided substrate 222 and the conductors 224. Although these types of adhesives are not pressure sensitive, they can work according to the same principle. Depending on the material of the substrate 222, different pressure-sensitive adhesives having particular adhesive properties may be used, for example, a customized pressure-sensitive adhesive specially developed for particular adhesive requirements.

Figure 6:
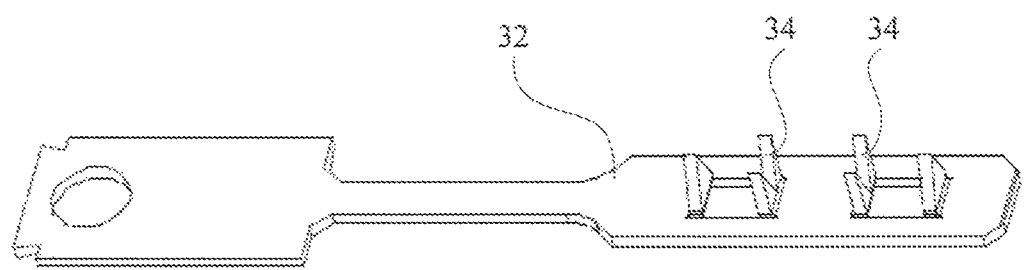
FIG. 6 is a perspective view of a riveting component for the RFID antenna of FIG. 5.

FIGS. 5a to 5c are schematic diagrams of an RFID antenna according to one embodiment of the present invention, where the covering layer 228 of the antenna body has been omitted for clarity of description. The conductors 224 are arranged on the slender substrate in a parallel manner. One end of the substrate 222, has conductor ends "A", "B" and "C" of the conductors and the other end has conductor ends "a", "b" and "c" of the conductors. The antenna body 22 is curled spatially, that is, the antenna body 22 is wrapped around the electronic apparatus (not shown in the Figures). The ends of the substrate 222 overlap such that the conductor ends "A", "B" and "C" are superimposed on the conductors ends "a", "b" and "c". Each pair of conductor ends are electrically connected together by rivets 30, as shown in FIG. 6. In this way, the conductors form a complete helical coil as the rivets join together the respective ends of the conductors, while the lead-out terminal allows easy connection of the antenna with the electronic device. As a result the need to use a double-sided substrate with bridging of the conductors by means of through holes is eliminated.

The POS device 40 includes a slot into which a credit card 44 may be inserted. The display screen of the POS device is provided with a columnar main body 42. The antenna 20 is wrapped around the columnar body 42, and a circuit board (not shown) is arranged inside the POS device, a connector is provided on the circuit board and the lead-out terminal 29 is inserted into the connector to connect the antenna to the electronic circuit. When using the POS device, the credit card of a user may be in contact communication with the POS device by the slot, or the credit card may be placed near the antenna 20 and be in non-contact communication with the POS device via the antenna 20.

FIG. 6 illustrates an exemplary rivet 30 as applied to the RFID antenna of FIG. 5. The rivet 30 is formed by a metallic conductor, which includes a body 32 and multiple spikes 34 arranged thereon. In use, the end 26 and the end 28 of the antenna are overlapped with each other. The conductors are insulated from each other as they are separated by the substrate 222. The end "A" of the conductors on the end 26 of the antenna is connected to the end "b" of the conductors on the end 28 of the antenna, the end "B" of the conductors on the end 26 of the antenna is connected to the end "c" of the conductors on the end 28 of the antenna, and the end "C" of the conductor on the end 26 of the antenna is connected to the end "a" of the conductors on the end 28 of the antenna. One of the multiple spikes 24 penetrates into a portion of one of the conductors 224 where the end 26 and the end 28 overlap with each other, to connect a head end of one of the parallel conductors in a upper layer to a tail end of one of the parallel conductors in a lower layer via the spikes 34, thereby achieving the electrical connections between the conductors.

The present invention provides antennas that are arranged spatially, hence, bridging of coils of the antenna is avoided, thus material utilization is improved reducing the production cost and the production efficiency is improved.

It can be appreciated that the POS device is only a preferred application of the electronic apparatus, and the antenna according to the disclosure may also be used in other electronic apparatuses which need to use a coil antenna.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A flexible RFID antenna, comprising:
a flexible single-sided substrate comprising a first end, a second end and a lead-out terminal;
a plurality of conductors parallel arranged on the substrate extending between the first end and the second end of the substrate and one conductor of the plurality of conductors being broken at the lead-out terminal and extends to an end of the lead-out terminal to form a connection terminal which does not cross over the plurality of conductors, and wherein the connection terminal protrudes out of the flexible single-sided substrate; and
a flexible covering layer applied to the substrate to sandwich the plurality of conductors between the substrate and the covering layer,
wherein ends of the plurality of conductors on the first end of the substrate are respectively connected in a staggered arrangement to ends of the plurality of conductors on the second end of the substrate to form a helical RFID coil.

2. The antenna of claim 1, wherein both the substrate and the coating layer are slender in shape.

3. The antenna of claim 2, wherein the substrate comprises a first insulating layer of a polyester (PET) film or a polyimide (PI) film with a thickness from 12 µm to 125 µm.

4. The antenna of claim 3, wherein the substrate further comprises a first adhesive layer for attaching the plurality of conductors to the substrate.

5. The antenna of claim 3, wherein the covering layer comprises a second insulating layer of the polyester (PET) film, a polyimide (PI) film or an insulating ink layer with a thickness from 12 µm to 50 µm.

6. The antenna of claim 5, wherein the covering layer further comprises a second adhesive layer for attaching the second insulating layer to the substrate.

7. The antenna of claim 3, wherein the covering layer comprises an insulating ink layer.

8. The antenna of claim 2, wherein the substrate of the antenna is provided with a fixing portion to fix the antenna.

9. The antenna of claim 1, wherein the first end and the second end of the antenna overlap with each other, and the ends of the plurality of conductors on the first end are electrically connected to respective the ends of the plurality of conductors on the second end by rivets.

10. The antenna of claim 1, wherein the first end comprises three conductor ends "A," "B" and "C," the second end comprises three conductor ends "a," "b" and "c;" the end "A" of the first end is connected to the end "b" of the second end, the end "B" of the first end is connected to the end "c," and the end "C" of the first end is connected to the end "a."

11. The antenna of claim 9, wherein the rivet is formed by a metallic conductor, which comprises a body and multiple spikes arranged thereon; and one of the multiple spikes penetrates into a portion of one of the conductors where the first end and the second end overlap with each other, to connect a head end of one of the parallel conductors in an upper layer to a tail end of one of the parallel conductors in a lower layer.

12. A point-of-sale (POS) device, comprising: a main body, a circuit board and an RFID antenna arranged on the main body, wherein the RFID antenna comprises:
   a flexible single-sided substrate comprising a first end, a second end and a lead-out terminal;
   a plurality of parallel conductors arranged on the substrate extending between the first end and the second end of the substrate and one conductor of the plurality of conductors being broken at the lead-out terminal and extends to an end of the lead-out terminal to form a connection terminal which does not cross over the plurality of conductors, and wherein the connection terminal protrudes out of the flexible single-sided substrate; and
   a flexible covering layer applied to the substrate to sandwich the plurality of conductors between the substrate and the covering layer,
   wherein ends of the plurality of conductors on the first end of the substrate are respectively connected in a staggered arrangement to ends of the plurality of conductors on the second of the substrate to form a helical RFID coil, and
   wherein the helical antenna is arranged around the main body and the connection terminal of the lead-out terminal of the antenna is electrically connected to the POS device.

13. The POS device of claim 12, wherein the first end and the second end of the antenna overlap with each other, and the ends of the plurality of parallel conductors on the first end are electrically connected to respective the ends of the plurality of parallel conductors on the second end by rivets.

14. The POS device of claim 12, wherein the substrate of the antenna is provided with a fixing portion, and the antenna is fixed on the main body of the POS device via the fixing portion.

15. The POS device of claim 12, wherein the antenna is fixed on the main body of the POS device via an adhesive.

16. The POS device of claim 12, wherein both the substrate and the covering layer are slender in shape.

17. An electronic device, comprising a main body and an antenna, wherein the antenna comprises:
   a flexible single-sided substrate comprising a first end, a second end and a lead-out terminal;
   a plurality of conductors arranged on the substrate extending between the first end and the second end of the substrate and one conductor of the plurality of conductors being broken at the lead-out terminal and extends to an end of the lead-out terminal to form a connection terminal which does not cross over the plurality of conductors, and wherein the connection terminal protrudes out of the flexible single-sided substrate; and
   a flexible covering layer applied to the substrate to sandwich the plurality of conductors between the substrate and the covering layer,
   wherein ends of the conductors on the first end of the substrate are electrically connected in a staggered arrangement to respective ends of the plurality of conductors on the second of the substrate to form a helical coil, and
   wherein the helical antenna is arranged around the main body of the electronic device and the connection terminal of the lead-out terminal of the antenna is electrically connected to the electronic device.

18. The electronic device of claim 17, wherein the first end and the second end of the antenna overlap with each other, and the ends of the plurality of parallel conductors on the first end are electrically connected to respective the ends of the plurality of parallel conductors on the second end by rivets.

* * * * *